United States Patent
Bajko et al.

(10) Patent No.: US 8,045,540 B2
(45) Date of Patent: Oct. 25, 2011

(54) HANDLING OF IDENTITIES IN A TRUST DOMAIN OF AN IP NETWORK

(75) Inventors: Gabor Bajko, San Diego, CA (US); Miguel A. Garcia-Martin, Helsinki (FI); Valtteri Niemi, Helsinki (FI); Tao Haukka, Oulu (FI)

(73) Assignee: Nokia Corporation, Espoo (FI)

( * ) Notice: Subject to any disclaimer, the term of this patent is extended or adjusted under 35 U.S.C. 154(b) by 1142 days.

(21) Appl. No.: 11/120,206

(22) Filed: May 3, 2005

(65) Prior Publication Data

US 2005/0249219 A1 Nov. 10, 2005

Related U.S. Application Data

(60) Provisional application No. 60/567,760, filed on May 3, 2004.

(51) Int. Cl.
 *H04L 12/66* (2006.01)
(52) U.S. Cl. ...................... 370/352; 370/395.3
(58) Field of Classification Search .............. 370/352, 370/395.3; 709/227, 229; 713/151, 155
See application file for complete search history.

(56) References Cited

U.S. PATENT DOCUMENTS

| | | | | |
|---|---|---|---|---|
| 2002/0129236 | A1* | 9/2002 | Nuutinen | 713/151 |
| 2003/0159029 | A1* | 8/2003 | Brown et al. | 713/151 |
| 2003/0217165 | A1* | 11/2003 | Buch et al. | 709/229 |

FOREIGN PATENT DOCUMENTS

WO WO 2004/008712 A1 1/2004

OTHER PUBLICATIONS

3GPP TS 33.203 V6.2.0, *3rd Generation Partnership Project; Technical Specification Group Services And System Aspects; 3G Security; Access Security for IP-Based Services* (Release 6), Mar. 2004, pp. 1-42.

3GPP TS 33.203 V6.6.0, *3rd Generation Partnership Project; Technical Specification Group Services And System Aspects; 3G Security; Access Security for IP-Based Services* (Release 6), Mar. 2005, pp. 1-44.

(Continued)

*Primary Examiner* — Chirag G Shah
*Assistant Examiner* — Minh-Trang Nguyen
(74) *Attorney, Agent, or Firm* — Mintz, Levin, Cohn, Ferris, Glovsky, and Popeo, P.C.

(57) ABSTRACT

A method for handling user identity and privacy, wherein a first Session Initiation Protocol (SIP) proxy is about to forward a SIP request to a next SIP proxy includes the step of determining whether Transport Layer Security (TLS) is supported in a hop to a next SIP proxy. When TLS is supported, the method includes establishing a TLS connection to the hop to the next SIP proxy, requesting a certificate from the next SIP proxy, receiving the certificate, verifying the certificate and trustworthiness of a network of the next SIP proxy and retaining identity information when the certificate and the trustworthiness of the network is verified. When TLS is not supported, or when the certificate is not verified, or when the trustworthiness of the network is not verified, the identity information is removed. Thereafter, the SIP request is forwarded over the TLS connection.

37 Claims, 2 Drawing Sheets

OTHER PUBLICATIONS

First Office Action dated Jun. 19, 2009, issued by the State Intellectual Property Office (SIPO) of the People's Republic of China, in connection with counterpart application 200580014131.4 (English translation included).

Decision of Rejection and English translation dated Aug. 24, 2009, issued by the Japanese Patent Office in connection with corresponding Japanese application No. 2007-512547.

Office Action dated Jan. 22, 2010, issued by the State Intellectual Property of China, issued in connection with counterpart Chinese patent application No. 2005800141314.

3GPP TS 33.203 v6.2.0, $3^{rd}$ Generation Partnership Project; Technical Specification Group Services and System Aspects; 3G Security; Access security for IP-based services (Release 6); Mar. 2004.

IETF RFC 3602 (2003), "The AES-CBC Cipher Algorithm and Its Use with IPsec," Sep. 2003, S. Frankel et. al.

IETF RFC 3263 (2002), "Session Initiation Protocol (SIP): Locating SIP Servers," Jun. 2002, J. Rosenberg et. al.

IETF RFC 3261 (2002), "SIP: Session Initiation Protocol," Jun. 2002, J. Rosenberg et. al.

3GPP TS 33.203, V6.0 (Mar. 2004), $3^{RD}$ Generation Partnership Project; Technical Specification Group Services and System Aspects; 3G Security; Access Security for IP-based Services (Release 6).

Jennings, et al., "Private Extensions to the Session Initiation Protocol (SIP) for Asserted Identity within Trusted Networks", RFC 3325, Nov. 2002.

J. Peterson, "A Privacy Mechanism for the Session Initiation Protocol (SIP)", RFC 3323, Nov. 2002.

* cited by examiner

HANDLING OF IDENTITIES IN A TRUST DOMAIN OF AN IP NETWORK

CROSS-REFERENCE TO RELATED APPLICATIONS

This application claims priority of U.S. Provisional Patent Application Ser. No. 60/567,760, filed on May 3, 2004. The subject matter of this earlier filed application is hereby incorporated by reference.

BACKGROUND OF THE INVENTION

1. Field of the Invention

The present invention relates to the handling of identities in portions of a network. The present invention further relates to the insertion or the removal of user asserted identities when crossing the boundary of the trust domain and honoring user privacy requirements with respect to asserted identities.

2. Description of the Related Art

In the 3rd Generation Partnership Project (3GPP) IP Multimedia Subsystem (IMS), Release 5, a system is considered to be a closed network of trusted parties. IMS sessions always originate or terminate in an IMS network and all IMS networks trust each other. This model precludes the establishment of an IMS session that originates or terminates in the public Internet. On the other hand, as all the IMS networks trust each other, Session Initiation Protocol (SIP) proxies (Call Session Control Function (CSCF), Breakout Gateway Control Function (BGCF), etc.) need not take any action about asserted identities in SIP requests. If an asserted identity is present when a request is received from another IMS (trusted) network, it is to be trusted. If the SIP proxy is going to send a SIP request to another network, the asserted identity is kept in the message.

3GPP IMS Release 6 allows IMS sessions to be established to and from internet SIP clients. This, however, requires a new trust model because, for a particular network, only selected (IMS or non-IMS) networks are considered to be trusted. It is required that SIP proxies (e.g., CSCF, BGCF, etc.) are able to take an action (e.g., removal) on asserted identities when traffic is routed to a non-trusted network. If a SIP proxy receives a SIP request from a trusted network and there is an asserted identity, it is kept. However, if a SIP proxy receives a SIP request from an untrusted network and there is an asserted identity, the SIP proxy removes the identity since it is not trusted. Similarly, if a SIP proxy is about to forward a request to a trusted network, it keeps any asserted identity. But if a SIP proxy is about to forward a request to an untrusted network, the asserted identity is removed.

The concept of the trust network in IMS is supported by the existence of an interconnection agreement between the two networks that trust each other. When two networks sign an interconnection agreement, they exchange security information. 3GPP IMS Release 5 does not support a mixture of trusted and untrusted nodes. The 3GPP IMS Release 5 specifies that all the IMS networks trust each other; in other words, connections to non-IMS networks are not allowed. 3GPP IMS Release 5 provides Internet Protocol security (IPsec) gateways and IPsec tunnels between any two IMS networks. However, IPsec gateways are not useful for the trusted/untrusted model in Release 6, since IPsec gateways operate with the IP layer, not the SIP layer, and since IPsec gateways are physically and logically different elements than SIP proxies. Additionally, the existence of an IPsec tunnel between two IMS operators is not enough to assume that there is a trust relationship at the SIP level between these operators.

Thus, there is a need for a method to determine whether a particular request is received from a trusted or untrusted source for a particular SIP proxy that is receiving a SIP request. Furthermore, it is also necessary to determine, prior to forwarding the SIP request, whether the next SIP proxy is trusted or not for a particular SIP proxy that is about to forward a SIP request to another network.

SUMMARY OF THE INVENTION

The present invention discloses a method for handling user identity and privacy, wherein a first Session Initiation Protocol (SIP) proxy is about to forward a SIP request to a next SIP proxy and includes the step of determining whether Transport Layer Security (TLS) is supported in a hop to a next SIP proxy. When TLS is supported, the method includes establishing a TLS connection to the hop to the next SIP proxy, requesting a certificate from the next SIP proxy, receiving the certificate, verifying the certificate and trustworthiness of a network of the next SIP proxy and retaining identity information when the certificate and the trustworthiness of the network is verified. When TLS is not supported, or when the certificate is not verified, or when the trustworthiness of the network is not verified, the identity information is removed. Thereafter, the SIP request is forwarded over the TLS connection.

The present invention is also directed to a method for determining whether a first SIP proxy belongs to a trusted network for purposes of handling user identity and privacy, wherein a next Session Initiation Protocol (SIP) proxy receives a SIP request from the first SIP proxy. The method includes the steps of receiving a SIP request from a first SIP proxy and determining whether the SIP request was received via TLS. When the SIP request was received via TLS, the method includes requesting a certificate from the first SIP proxy, receiving the certificate, verifying the certificate and trustworthiness of a network of the first SIP proxy and retaining identity information when the certificate and the trustworthiness of the network is verified. When TLS is not supported, or when the certificate is not verified, or when the trustworthiness of the network is not verified, the identity information is removed. Thereafter, the method includes responding to the SIP request.

The present invention is also directed to a communications device including establishing means for establishing a Transport Layer Security (TLS) connection to a hop to a next SIP proxy, determining means for determining whether TLS is supported in the hop to the next SIP proxy, requesting means for requesting a certificate from the next SIP proxy, receiving means for receiving the certificate, verifying means for verifying the certificate and trustworthiness of a network of the next SIP proxy and forwarding means for forwarding the SIP request over the TLS connection. The communications device is configured to retain identity information when the certificate is verified, when the trustworthiness of the network is verified and when TLS is supported, and configured to remove the identity information when TLS is not supported or the certificate is not verified or when the trustworthiness of the network is not verified.

The present invention is also directed to a communications system including a Transport Layer Security (TLS) connection establisher, configured to establish a TLS connection to a hop to a next SIP proxy, a TLS support analyzer, configured to determine whether TLS is supported in the hop to the next SIP proxy, a verification module, configured to request a certificate from the next SIP proxy, receive the certificate and verify the certificate and trustworthiness of a network of the next SIP proxy and a SIP request handler; configured to forward the SIP request over the TLS connection. The communications system is configured to retain identity information when the certificate is verified, when the trustworthiness of the network is verified and when TLS is supported, and configured to remove the identity information when TLS is not supported or the certificate is not verified or when the trustworthiness of the network is not verified.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

In the Packet-Switched (PS) domain, service is not provided until a security association is established between the mobile equipment and the network. IP Multimedia Core Network Subsystem (IMS) is essentially an overlay to the PS-Domain and has a low dependency of the PS-domain. Consequently a separate security association is required between the multimedia client and the IMS before access is granted to multimedia services. The IMS Security Architecture is shown in the FIG. 1.

Figure 1:
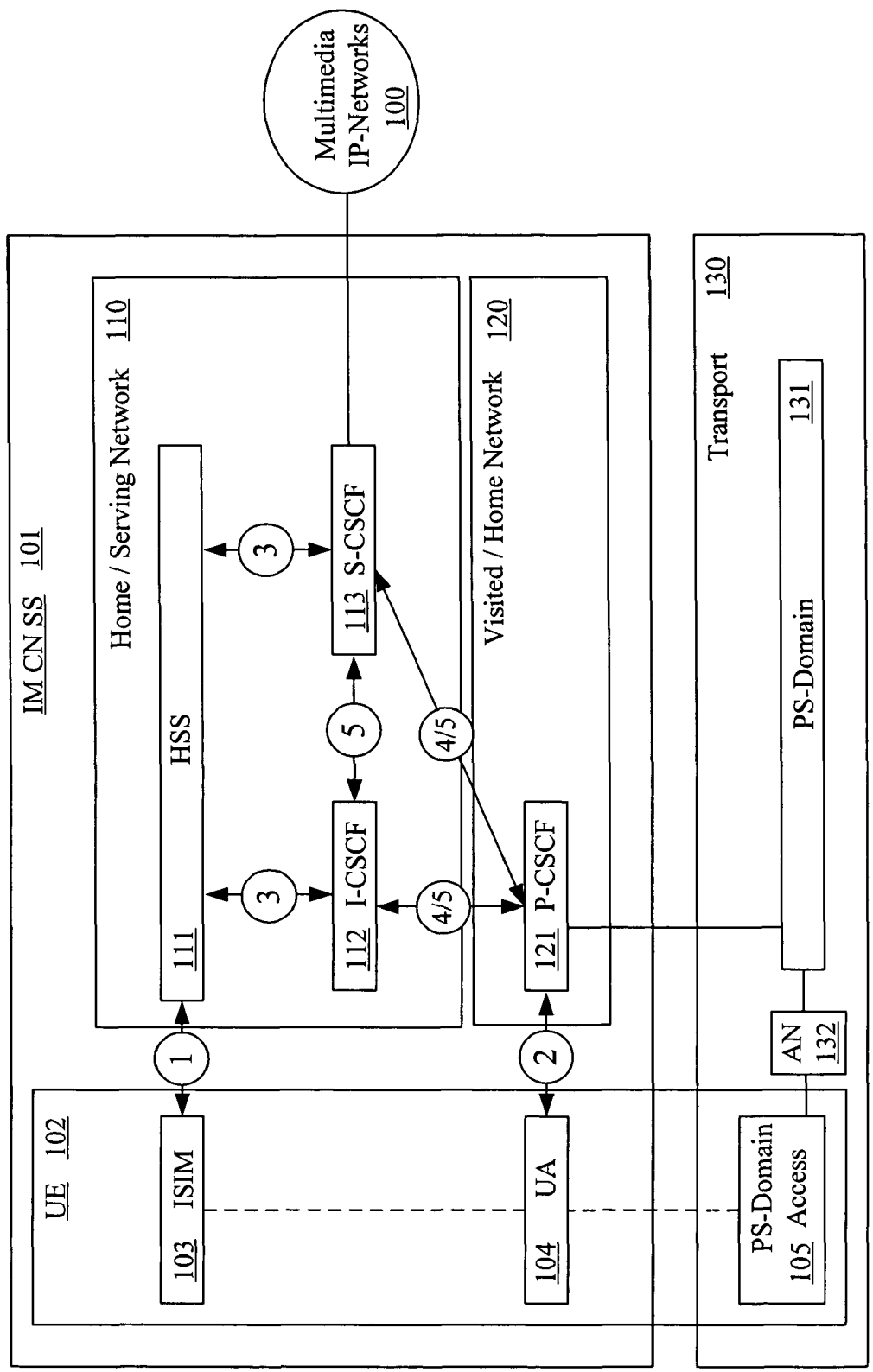
FIG. 1 illustrates a the IMS security architecture.

FIG. 1 illustrates the relationship between the home/serving network 110, the visited/home network 120 and the user equipment 102, with the home/serving network having a Home Subscriber Server 111 (HSS). FIG. 1 illustrates the call control protocol between a mobile device (i.e., user equipment 102 (UE), subscriber, etc.) and various network elements such as a Serving Call Session Control Function 113 (S-CSCF), Proxy Call Session Control Function 121 (P-CSCF), and Interrogating Call Session Control Function 112 (I-CSCF).

IMS authentication keys and functions at the user side are stored on a Universal Integrated Circuit Card (UICC). It is possible for the IMS authentication keys and functions to be logically independent and the keys and functions used for PS domain authentication. However, this does not preclude common authentication keys and functions from being used for IMS and PS domain authentication. The IP Multimedia Services Identity Module 103 (ISIM) provides the collection of IMS security data and functions on a UICC.

There are five different security associations and different needs for security protection for IMS and they are numbered 1, 2, 3, 4 and 5 in FIG. 1. The first association, number 1, provides mutual authentication. The HSS delegates the performance of subscriber authentication to the S-CSCF. However the HSS is responsible for generating keys and challenges. The long-term key in the ISIM and the HSS is associated with the IMPI. The subscriber will have one (network internal) user private identity (IMPI) and at least one external user public identity (IMPU). The second association, number 2, provides a secure link and a security association between the UE and a P-CSCF for protection of the Gm reference point. Data origin authentication is provided i.e. the corroboration that the source of data received is as claimed.

The third association, number 3, provides security within the network domain internally for the Cx-interface. The fourth association, number 4, provides security between different networks for SIP capable nodes. This security association is only applicable when the P-CSCF resides in the VN and if the P-CSCF resides in the HN, then number five applies. The last association, number 5, provides security within the network internally between SIP capable nodes.

There exist other interfaces and reference points in IMS, which have not been addressed above. Those interfaces and reference points reside within the IMS, either within the same security domain or between different security domains. Mutual authentication is required between the UE and the HN. An independent IMS security mechanism provides additional protection against security breaches. For example, if the PS-Domain security is breached, the IMS would continue to be protected by it's own security mechanism.

Support for the trust model is guaranteed by the existence of interconnect agreements between trusted networks, as discussed above. Every SIP proxy contains a database that contains the list of trusted networks together with the security parameters visible in a certificate. The security parameters may be a certificate authority or a common name or organization.

Privacy may, in many instances, be equivalent to confidentiality. This can include hiding the information, using encryption and encryption keys, from all entities except those who are authorized to understand the information. The SIP Privacy Extensions for IMS Networks do not provide for such confidentiality. The purpose of the mechanism is rather to give an IMS subscriber the possibility to withhold certain identity information. It is useful that the privacy mechanism for IMS networks does not create states in the CSCFs other than the normal SIP states.

According to at least one embodiment, when a Rel-6 (Release 6) IMS is interworking with a non-IMS network, the CSCF in IMS network decides the trust relation, based on whether the security mechanism for the interworking is applied as well as the availability of an inter-working agreement. If the interworking network is not trusted, the privacy information is removed from the traffic towards to the foreign network. When receiving SIP signalling, the CSCF also verifies if any privacy information is already contained. If the interworking network is not trusted, the information is removed by the CSCF, and retained otherwise.

Because absence of the security mechanism, when the interworking network indicates an untrusted non-IMS network, separate CSCFs are usually needed to interface with IMS and non-IMS networks. The CSCF interfacing with IMS networks implicitly trusts all IMS networks reachable via the SEG that establishes security. A Rel-5 (Release 5) CSCF always assumes this trust relationship and network configuration. For a Rel-6 CSCF, this implicit trust setting is a configuration option that an operator can set according to the network and interface configuration.

Figure 2:
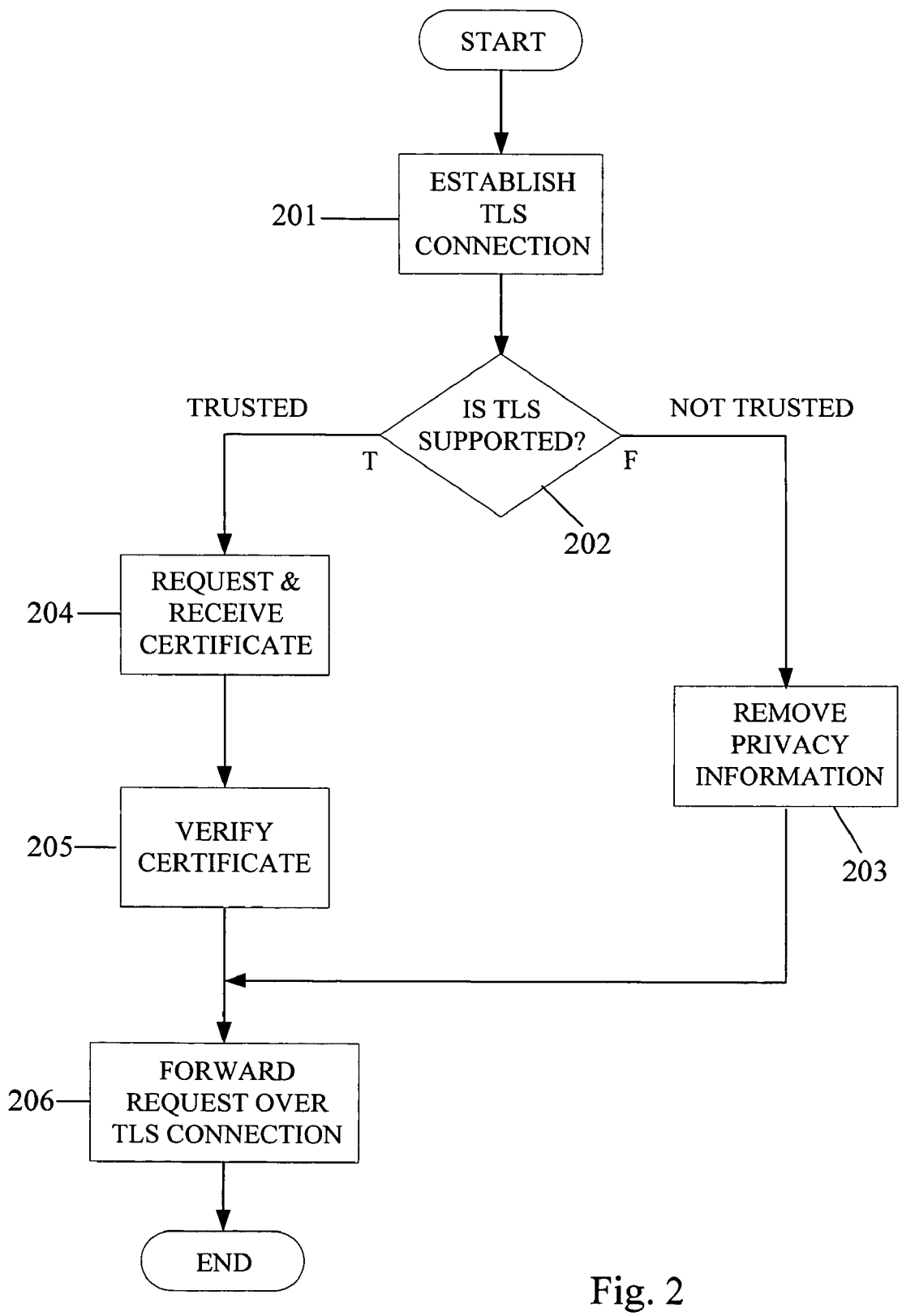
FIG. 2 illustrates a flowchart showing privacy handling, according to one embodiment of the present invention.

FIG. 2 illustrates a flowchart showing privacy handling in accordance with an embodiment of the invention. An IMS SIP proxy, that is about to forward a SIP request to the next SIP proxy, establishes a Transport Layer Security (TLS), step 201, connection to that next hop. If TLS is not supported in the next hop, then the network is untrusted and privacy information is removed, in step 203. If TLS is supported, decision

202, the IMS SIP proxy requests a certificate from the other SIP proxy, step 204. On reception of the certificate, the IMS SIP proxy evaluates whether the certificate is valid, in step 205, and if it belongs to a trusted network. In case it belongs to a trusted network, the IMS proxy keeps the asserted identity, otherwise it removes it. Then, it forwards the SIP request over the TLS connection, in step 206. It is also possible that the SIP proxy already has a certificate for the other party as a result of previous connection. Then it may be enough to just verify that the certificate is still valid.

Similarly, an IMS SIP proxy that receives a SIP request, applies these same rules. If the request is not received via TLS, the sending SIP proxy is not trusted. If the request is sent via TLS, the IMS SIP proxy request the sending SIP proxy a certificate. Then the IMS SIP proxy verifies the certificate against the list of trusted networks, determining whether the sending SIP proxy is trusted or not. Again, there may be a certificate from earlier connection.

Additionally, each IMS network configures the Domain Name Server (DNS) Naming Authority Pointer (NAPTR) records to give higher preference to TLS over User Datagram Protocol (UDP), Transmission Control Protocol (TCP), Stream Control Transmission Protocol (SCTP) (or other transport protocols) for the SIP service. This allows an IMS network to always try first TLS as a transport protocol.

Regarding the interoperability with a Rel-5 network, a Rel-6 IMS network uses a backward compatible solution, i.e. Internet Protocol security (IPsec) via a Security gateway (SGW). The receiving SGW needs to change the port number of the SIP messages to the protected port of the CSCFs so as to indicate the receiving CSCF that packets have been IPsec protected. If there is interconnection agreement, then the user identity is forwarded or trusted at reception. Otherwise the user identity is removed. Another aspect of the invention is directed to how to provide backward compatibility between IMS Release 5 nodes and IMS Release 6.

In a first example, an IMS Rel-5 SIP proxy is sending a SIP request to an IMS Rel-6 node. The IMS Rel-5 SIP proxy does not take any action on the asserted identity, since it considers the IMS Release 6 network trusted. However, the IMS Rel-6 SIP proxy will remove the asserted identity, since the request does not use TLS.

According to embodiments of the instant invention, as the request traverses interdomain boundaries between two IMS networks, the SIP message will traverse a SGW in the IMS Rel-5 network, and then another SGW in the IMS Rel-6 network. This traffic is protected using IPSec ESP. The SGW in the IMS Rel-6 network can retarget the destination port number (of the SIP proxy in the Rel-6 network) to a protected port number. The SIP proxy in the IMS Rel-6 network allocates two port numbers, one where regular traffic is received, another one where the Security Gateway sends traffic that has been received via an IPsec tunnel (from the IMS Rel-5 network). The existence of the IPsec tunnel indicates that the other end is an IMS network (and trusted by Rel-5 guidelines).

In a second example, an IMS Rel-5 SIP proxy is receiving a SIP request from an IMS Rel-6 network. Since the IMS Rel-5 network considers everything trusted, the IMS Rel-5 SIP proxy will not take any action on asserted identities. According to release 5 guidelines the request should come via security gateways in this case but this does not affect the action.

In a third example, an IMS Rel-6 SIP proxy is sending a SIP request to an IMS Rel-5 network. By default, since the IMS Rel-5 does not support TLS, the IMS Rel-6 SIP proxy will remove the asserted identity. According to embodiments of the present invention, the preferred action is to do nothing further. If the asserted identities need to be sent for some reason, then the operators have to do an interconnect agreement that contains an exempt from using TLS on the grounds that the other party is release 5. Now, the sending proxy will have to indicate to the security gateway of its own network that IPsec ESP must be applied. This indication could be done by using a dedicated source IP address for the sending proxy.

In a fourth example, an IMS Rel-6 SIP proxy is receiving a SIP request from an IMS Rel-5 network. Since the IMS Rel-5 network does not support TLS, then the IMS Rel-6 SIP proxy, by default, will consider the request coming from a non-trusted network. In this case, the solution is the same as that discussed for the first example above.

SIP signalling protected by Transport Layer Security (TLS) may be used to protect the SIP interoperation between an IMS CSCF with a proxy/CSCF located in a foreign network. The CSCF may request the TLS connection with a foreign Proxy by publishing sips: URI in DNS server, that can be resolved via. NAPTR/SRV mechanism. When sending/receiving the certificate during the TLS handshaking phase, the CSCF verifies the name on the certificate against the list of the interworking partners. The TLS session can be initiated from either network. A TLS connection is capable of carrying multiple SIP dialogs.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A method, comprising:
   determining whether transport layer security is supported in a hop to a next session initiation protocol proxy;
   when the transport layer security is supported,
     establishing a transport layer security connection from a first session initiation protocol proxy to the hop of the next session initiation protocol proxy, wherein the first session initiation protocol proxy is at an internet protocol multimedia core network system, and the next session initiation protocol proxy is at a network comprising a non-internet protocol multimedia core network system;
     requesting a certificate from the next session initiation protocol proxy;
     receiving the certificate;
     verifying, during the establishment of the transport layer security connection, the certificate and a trustworthiness of the network of the next session initiation protocol proxy, wherein the determining determines that the transport layer security is supported to the next session initiation protocol proxy, when establishing the transport layer security connection;
     retaining privacy information in one or more session initiation protocol messages, when the certificate and the trustworthiness of the network is verified;
   when at least one of the transport layer security is not supported, the certificate is not verified, and the trustworthiness of the network is not verified,
     removing the privacy information from the one or more session initiation protocol messages; and
     forwarding the one or more session initiation protocol messages.

2. The method according to claim 1, wherein the verifying the certificate comprises determining whether the certificate is valid.

3. The method according to claim 1, wherein the verifying the trustworthiness of the network comprises determining whether the network belongs to a group of trusted networks.

4. The method according to claim 3, wherein the determining whether the network belongs to a group of trusted networks comprises determining whether the network is on a list of trusted networks.

5. The method according to claim 1, wherein the next session initiation protocol proxy previously sent a prior certificate and the verifying the certificate comprises determining whether the prior certificate is still valid.

6. The method according to claim 1, further comprising: maintaining separate call session control functions for trusted and non-trusted session initiation protocol proxies.

7. The method according to claim 1, further comprising: configuring a domain name server naming authority pointer to give higher preference to the transport layer security.

8. The method of claim 1, wherein the privacy information comprises identify information of a subscriber.

9. A method, comprising:
receiving a session initiation protocol request from a first session initiation protocol proxy;
determining whether the session initiation protocol request was received via transport layer security;
when the session initiation protocol request was received via the transport layer security,
requesting a certificate from the first session initiation protocol proxy;
receiving the certificate;
verifying, during the establishment of a transport layer security connection, the certificate and a trustworthiness of a network of the first session initiation protocol proxy, the trustworthiness verified when the transport layer security is used to provide the received session initiation protocol request;
retaining privacy information when the certificate and the trustworthiness of the network is verified;
when at least one of the transport layer security is not supported, the certificate is not verified, and the trustworthiness of the network is not verified,
removing the privacy information; and
responding to the session initiation protocol request.

10. The method according to claim 9, wherein the verifying the certificate comprises determining whether the certificate is valid.

11. The method according to claim 10, wherein the verifying the trustworthiness of the network comprises determining whether the network belongs to a group of trusted networks.

12. The method according to claim 10, wherein the determining whether the network belongs to a group of trusted networks comprises determining whether the network is on a list of trusted networks.

13. The method according to claim 8, wherein the first session initiation protocol proxy previously sent a prior certificate and the step of verifying the certificate comprises determining whether the prior certificate is still valid.

14. The method according to claim 8, further comprising: maintaining separate call session control functions for trusted and non-trusted session initiation protocol proxies.

15. The method according to claim 9, further comprising: configuring a domain name server naming authority pointer to give higher preference to transport layer security.

16. The method of claim 9, wherein the privacy information comprises identify information of a subscriber.

17. An apparatus, comprising:
an establisher configured to establish a transport layer security connection from a first session initiation protocol proxy to a hop of a next session initiation protocol proxy, wherein the first session initiation protocol proxy is at an internet protocol multimedia core network system, and the next session initiation protocol proxy is at a network comprising a non-internet protocol multimedia core network system;
a determiner configured to determine whether transport layer security is supported in the hop to the next session initiation protocol proxy;
a requester configured to request a certificate from the next session initiation protocol proxy;
a receiver configured to receive the certificate;
a verifier configured to verify, during the establishment of the transport layer security connection, the certificate and a trustworthiness of the network of the next session initiation protocol proxy, wherein the determiner determines that the transport layer security is supported to the next session initiation protocol proxy, when establishing the transport layer security connection; and
a forwarder configured to forward a session initiation protocol request,
wherein the apparatus is configured to retain privacy information when at least one of the certificate is verified, the trustworthiness of the network is verified, and the transport layer security is supported, and wherein the apparatus is further configured to remove the privacy information when at least one of the transport layer security is not supported, the certificate is not verified, and the trustworthiness of the network is not verified, and wherein the apparatus comprises at least one processor.

18. The apparatus according to claim 17, wherein the verifier is configured to determine whether the certificate is valid.

19. The apparatus according to claim 17, wherein the verifier is configured to determine whether the network belongs to a group of trusted networks.

20. The apparatus according to claim 19, wherein the determiner which determines whether the network belongs to a group of trusted networks also determines whether the network is on a list of trusted networks.

21. The apparatus according to claim 17, wherein when the next session initiation protocol proxy previously sent a prior certificate, and the verifier is configured to verify whether the prior certificate is still valid.

22. The apparatus according to claim 17, further comprising a maintainer configured to maintain call session control functions for trusted and non-trusted session initiation protocol proxies.

23. The apparatus according to claim 17, further comprising a controller configured to control a domain name server naming authority pointer to give higher preference to transport layer security.

24. The apparatus of claim 17, wherein the privacy information comprises identify information of a subscriber.

25. A system, comprising:
a transport layer security connection establisher configured to establish a transport layer security connection to a hop of a next session initiation protocol proxy from a first session initiation protocol proxy;
a transport layer security support analyzer configured to determine whether transport layer security is supported in the hop to the next session initiation protocol proxy;

a verification module configured to request a certificate from the next session initiation protocol proxy, receive the certificate and verify, during the establishment of the transport layer security connection, the certificate and a trustworthiness of a network of the next session initiation protocol proxy, wherein the determination of whether the transport layer security is supported to the next hop occurs, when establishing the transport layer security connection; and a session initiation protocol request handler configured to forward a session initiation protocol request over the transport layer security connection, wherein the system is configured to retain privacy information when at least one of the certificate is verified, the trustworthiness of the network is verified, and the transport layer security is supported, and wherein the system is further configured to remove the privacy information when at least one of the transport layer security is not supported, the certificate is not verified, and the trustworthiness of the network is not verified, and wherein the system comprises at least one processor.

26. The system according to claim 25, wherein the verification module is configured to determine whether the network is on a list of trusted networks.

27. The system of claim 25, wherein the privacy information comprises identify information of a subscriber.

28. A computer program embodied on a non-transitory computer readable medium, said computer program configured to control a processor to perform operations comprising:
determining whether transport layer security is supported in a hop to a next session initiation protocol proxy from a first session initiation protocol proxy;
when the transport layer security is supported,
establishing a transport layer security connection to the hop to the next session initiation protocol proxy;
requesting a certificate from the next session initiation protocol proxy; receiving the certificate;
verifying, during the establishment of the transport security connection, the certificate and a trustworthiness of a network of the next session initiation protocol proxy, wherein the determining determines that the transport layer security is supported to the next session initiation protocol proxy, when establishing the transport layer security connection;
retaining privacy information, when the certificate and the trustworthiness of the network is verified;
when at least one of the transport layer security is not supported, the certificate is not verified, and the trustworthiness of the network is not verified,
removing the privacy information; and
forwarding a session initiation protocol request.

29. The computer program according to claim 28, wherein the verifying the certificate comprises determining whether the certificate is valid.

30. The computer program according to claim 28, wherein the verifying the trustworthiness of the network comprises determining whether the network belongs to a group of trusted networks.

31. The computer program according to claim 30, wherein the determining whether the network belongs to a group of trusted networks comprises determining whether the network is on a list of trusted networks.

32. The computer program according to claim 28, wherein the next session initiation protocol proxy previously sent a prior certificate and the step of verifying the certificate comprises determining whether the prior certificate is still valid.

33. The computer program of claim 32, wherein the privacy information comprises identify information of a subscriber.

34. A computer program embodied on a non-transitory computer readable medium, said computer program configured to control a processor to perform operations comprising:
determining whether a first session initiation protocol proxy belongs to a trusted network for purposes of handling user identity and privacy;
receiving a session initiation protocol request from the first session initiation protocol proxy at a next session initiation protocol proxy;
determining whether the session initiation protocol request was received via transport layer security;
when the session initiation protocol request was received via the transport layer security,
requesting a certificate from the first session initiation protocol proxy; receiving the certificate;
verifying, during the establishment of a transport layer security connection, the certificate and a trustworthiness of a network of the first session initiation protocol proxy, wherein the determining determines that the transport layer security is supported to the next session initiation protocol proxy, when establishing the transport layer security connection;
retaining privacy information when the certificate and the trustworthiness of the network is verified;
when at least one of the transport layer security is not supported, the certificate is not verified, and the trustworthiness of the network is not verified,
removing the privacy information; and
responding to the session initiation protocol request.

35. The computer program according to claim 34, wherein the verifying the certificate comprises determining whether the certificate is valid.

36. The computer program according to claim 34, wherein the verifying the trustworthiness of the network comprises determining whether the network belongs to a group of trusted networks.

37. The computer program according to claim 36, wherein the determining whether the network belongs to a group of trusted networks comprises determining whether the network is on a list of trusted networks.

* * * * *